(12) United States Patent
Wildman

(10) Patent No.: US 8,447,953 B2
(45) Date of Patent: May 21, 2013

(54) INSTRUCTION CONTROLLER TO DISTRIBUTE SERIAL AND SIMD INSTRUCTIONS TO SERIAL AND SIMD PROCESSORS

(75) Inventor: Leon David Wildman, Glos (GB)

(73) Assignee: Rambus Inc., Sunnyvale, CA (US)

( * ) Notice: Subject to any disclaimer, the term of this patent is extended or adjusted under 35 U.S.C. 154(b) by 492 days.

(21) Appl. No.: 11/815,535

(22) PCT Filed: Feb. 7, 2006

(86) PCT No.: PCT/GB2006/000414
§ 371 (c)(1),
(2), (4) Date: Aug. 3, 2007

(87) PCT Pub. No.: WO2006/090108
PCT Pub. Date: Aug. 31, 2006

(65) Prior Publication Data
US 2008/0209164 A1    Aug. 28, 2008

(30) Foreign Application Priority Data
Feb. 25, 2005 (GB) ................................. 0504014.2

(51) Int. Cl.
*G06F 9/30* (2006.01)
(52) U.S. Cl.
USPC .......................................................... 712/22
(58) Field of Classification Search
None
See application file for complete search history.

(56) References Cited

U.S. PATENT DOCUMENTS

| | | | |
|---|---|---|---|
| 5,649,179 A | 7/1997 | Steenstra | |
| 5,758,176 A | 5/1998 | Agarwal | |
| 5,872,985 A | 2/1999 | Kimura | 395/800.01 |
| 5,890,222 A * | 3/1999 | Agarwal et al. | 711/220 |
| 6,334,176 B1 * | 12/2001 | Scales et al. | 712/4 |
| 6,578,137 B2 * | 6/2003 | Parady | 712/228 |
| 6,944,744 B2 * | 9/2005 | Ahmed et al. | 712/20 |
| 7,330,964 B2 * | 2/2008 | Tran et al. | 712/241 |

(Continued)

FOREIGN PATENT DOCUMENTS
EP    0449661    11/1995
EP    0605875    11/1998

(Continued)

OTHER PUBLICATIONS

Architectural simulation system for M.f.a.s.t, XP010157608 CHL Moller & GG Pechanek: Simulation Symposium, 1996. Proceedings of the 29th Annual New Orleans, LA, USA Apr. 8-11, 1996, Los Alamitos, CA, IEEE Comput. Soc., US, Apr. 8, 1996.

(Continued)

*Primary Examiner* — Jacob A Petranek
(74) *Attorney, Agent, or Firm* — The Neudeck Law Firm, LLC

(57) ABSTRACT

A microprocessor architecture comprises a plurality of processing elements arranged in a single instruction multiple data SIMD array, wherein each processing element includes a plurality of execution units, each of which is operable to process an instruction of a particular instruction type, a serial processor which includes a plurality of execution units, each of which is operable to process an instruction of a particular instruction type, and an instruction controller operable to receive a plurality of instructions, and to distribute received instructions to the execution units in dependence upon the instruction types of the received instruction. The execution units of the serial processor are operable to process respective instructions in parallel.

18 Claims, 4 Drawing Sheets

U.S. PATENT DOCUMENTS

| | | | |
|---|---|---|---|
| 2004/0006683 A1 | 1/2004 | Brekelbaum | |
| 2004/0054879 A1* | 3/2004 | Macy et al. | 712/221 |
| 2004/0215892 A1 | 10/2004 | Fluhr | |

FOREIGN PATENT DOCUMENTS

| | | |
|---|---|---|
| JP | 4-291659 | 10/1992 |
| JP | 8-147165 | 6/1996 |
| WO | WO 2005/103887 | 11/2005 |
| WO | WO 2005/111831 | 11/2005 |
| WO | WO 2006/083542 | 8/2006 |

OTHER PUBLICATIONS

Espasa et al., Tarantual: a vector extension to the alpha architecture, Proceedings of the 29th International Symposium on Computer Architecture. ISCA 2002. Anchorage, AL May 25-29, 2002, Los Alamitos, CA: IEEE Comp. Soc. May 25, 2002, XP010797274.

Intel, Intel IXP1200 Network Processor Family Hardware Reference Manual, Aug. 10, 2001, XP002370938.

International Search Report published Apr. 27, 2006.

United Kingdom Search Report for corresponding British application, published in part on Apr. 25, 2005 and in part on May 23, 2005.

United Kingdom Search Report for corresponding British application, published Sep. 4, 2007.

GB Further Search Report under Section 17 for claims 3-6 & 27-30, with search date of May 23, 2005; re GB 0504014.2. 1 page.

GB Combined Search and Examination Report under Sections 17 and 18(3) with mail date of Apr. 26, 2005; re GB 0504014.2. 6 pages.

GB Search Report under Section 17(6) for claims 7-9 & 27-30, with mail date of May 24, 2005; re GB 0504014.2. 13 pages.

GB Search Report under Section 17(6) for claims 11 & 31-33, with mail date of May 24, 2005; re GB 0504014.2. 16 pages.

GB Response to Combined Search and Examination Report dated Apr. 26, 2005, with mail date of Apr. 26, 2007; re GB 0504014.2. 15 pages.

GB Response to Examination Report dated Sep. 5, 2007, with mail date of Oct. 1, 2007, re GB 0504014.2. 2 pages.

GB Response to Examination Report dated Sep. 5, 2007, with mail date of Jan. 29, 2008, re GB 0708595.4. 8 pages.

GB Examination Report under Section 18(3) with mail date of Sep. 2, 2008, re GB 0708595.4. 1 page.

JP Office Action dated Sep. 21, 2011 for JP Application No. 2007-556643. 10 Pages.

* cited by examiner

INSTRUCTION CONTROLLER TO DISTRIBUTE SERIAL AND SIMD INSTRUCTIONS TO SERIAL AND SIMD PROCESSORS

The present invention relates to microprocessor architectures, and, in particular, to architectures for processors including a SIMD processor array.

BACKGROUND OF THE INVENTION

FIG. 1 of the accompanying drawings illustrates a previously considered microprocessor architecture which includes a Single Instruction Multiple data (SIMD) processor array. The processor includes a serial processor 10 operable to process non-parallel instructions such as fetching instructions, and performing branching and calculations. The architecture also includes a SIMD array 19 of processing elements 20, which are controlled by an array controller 12. The array controller 12 is controlled by the serial processor 10.

The serial processor 10 receives an instruction stream from an instruction cache (not shown). The serial processor 10 then executes the retrieved serial instructions. The serial processor 10 issues SIMD instructions to the array controller 12 which decodes and prioritises the received SIMD instructions, and sends appropriate control signals to the SIMD array 19 of processing elements (PEs) 20. The SIMD array 19 operates in a known manner, such that the processing elements all carry out the same instructions on data specific to the PE 20.

As illustrated in FIG. 1, the SIMD array 19 comprises an array of processor elements (PEs) 20 which are arranged to operate in parallel. Each PE 20 in the SIMD array 19 contains an Arithmetic Logic Unit (ALU) 22, a register file 24, PE memory 26 and an Input/Output (I/O) unit 26. The SIMD array 19 operates in a synchronous manner, where each PE 20 executes the same instruction at the same time as the other PEs, but using data specific to the individual PE. Each of these execution units in the PE performs a specific task: the ALU 22 performs arithmetic functions, the register file 24 stores data for use by the ALU 22 and for transfer with the internal PE memory 26, and the I/O unit 26 handles data transfer between the PE memory 26 and external memory (not shown). PE data is stored in PE memory 26 and is transferred to the ALU 22 using the register file 24. The array controller 12 issues instructions to the array 19 that cause data to be transferred between the I/O unit 28, the PE memory 26, the register file 24 and the ALU 22, as well as instructions to operate on the data in the ALU 22.

There are some disadvantages with the previously-considered architecture. The instructions are held in one queue to be executed by the PEs, which can cause substantial delay in processing. Also, during the execution of any one instruction, only one execution unit of each PE 20 is occupied. For example, if the instruction is to multiply two numbers together, only the ALU 22 of each PE 20 is working. Alternatively, if the instruction is to fetch a data item from an external memory, then only the I/O 28 of each PE 20 is working.

It is therefore desirable to provide techniques which can overcome these disadvantages.

SUMMARY OF THE PRESENT INVENTION

According to one aspect of the present invention, there is provided a microprocessor architecture comprising:

a plurality of processing elements arranged in a single instruction multiple data SIMD array of execution units, each of which is operable to process an instruction of a particular instruction type;

a serial processor which includes a plurality of execution units, each of which is operable to process an instruction of a particular instruction type; and an instruction controller operable to receive a plurality of instructions, and to distribute received instructions to the execution units of the SIMD array and serial processor in dependence upon the instruction types of the received instructions, wherein the execution units of the serial processor are operable to process respective instructions in parallel.

According to another aspect of the invention, there is provided a microprocessor architecture comprising:

a plurality of processing elements arranged in a single instruction multiple data SIMD array, wherein each processing element includes a plurality of execution units, each of which is operable to process an instruction of a particular instruction type; and an instruction controller operable to receive a plurality of instructions, and to distribute received instructions to the execution units of the processing elements in dependence upon the instruction types of the received instructions, wherein the execution units of each processing element are operable to process respective instructions in parallel.

According to another aspect of the present invention, there is provided a microprocessor architecture comprising:

a plurality of processing elements arranged in a single instruction multiple data SIMD array of execution units; and a serial processor which includes a plurality of execution units, each of which is operable to process an instruction of a particular instruction type, wherein one of the execution units of the serial processor is a register unit operable to store data for processing by at least one other of the execution units of the serial processor, and wherein the register unit includes a plurality of sets of registers, which sets are associated with respective processing threads.

According to another aspect of the present invention, there is provided a method of executing instructions in execution units of a processor which includes a single instruction multiple data array of processing elements, the execution units being operable to process instructions of respective instruction types, the method comprising:

receiving a stream of instructions;

distributing the received instructions to the execution units in dependence upon the instruction type, such that the execution units are operable to process respective instructions in parallel with one another.

DESCRIPTION OF THE PREFERRED EMBODIMENTS

Figure 1:
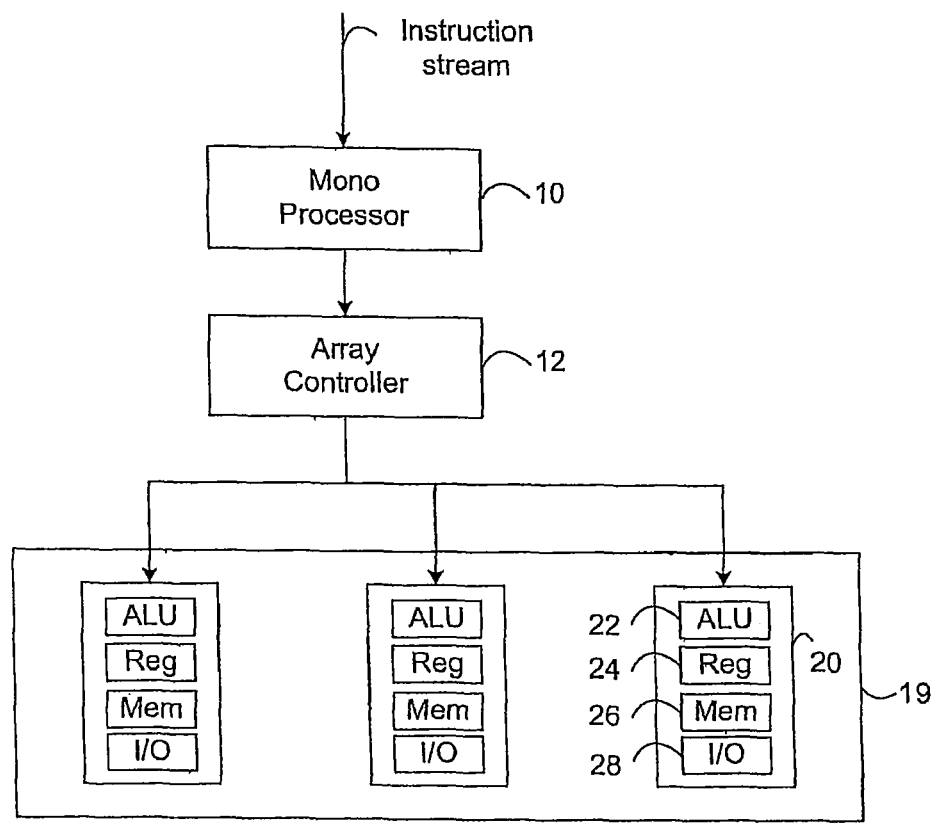
FIG. 1 is a schematic block diagram illustrating a previously considered SIMD processor architecture.
Figure 2:
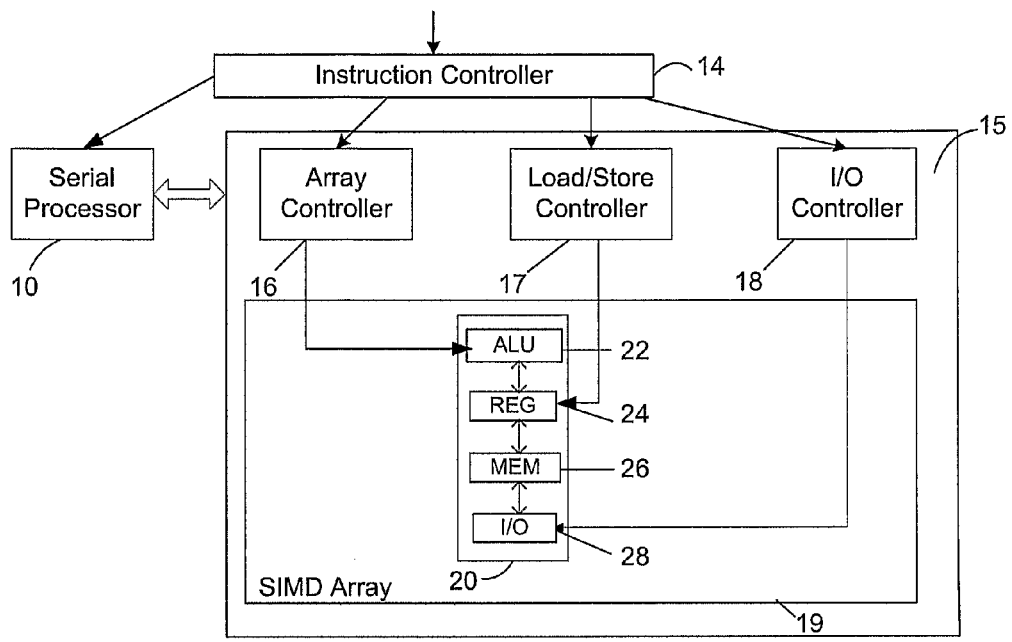
FIGS. 2 and 3 are schematic block diagrams illustrating the main elements of respective architectures embodying the present invention.

FIG. 2 is a block diagram illustrating main elements of an architecture embodying the present invention. The architecture of FIG. 2 includes a serial processor 10, a parallel processor 15 and an instruction controller 14. The instruction controller 14 operates to fetch, decode and distribute instructions to the serial processor 10 and to the parallel processor 15, as will be described in detail below. The parallel processor includes an array 19 of PEs 20, and a plurality of sub-controllers. For the sake of clarity, only a single PE is illustrated in FIG. 2. It will be readily appreciated that the SIMD array 19 can include any number of PEs 20. In the example embodiment of FIG. 2, the sub controllers are represented by an array controller 16, a load/store controller 18, and an I/O controller 16. Instructions are directed from the instruction controller to the sub controllers in the parallel processor 15 or to the serial processor 10.

Each PE 20 of the SIMD array 19 comprises, in the example shown in FIG. 2, an arithmetic logic unit (ALU) 22, a Register File (Reg) 24, and an I/O unit (I/O) 26. Each of these execution units in the PE (ALU 22, Register File 24 and I/O 28) perform respective tasks: the ALU 22 performs arithmetic functions, the register file 24 stores data for use by the ALU 22 and for transfer with the internal PE memory 26, and the I/O unit 28 handles data transfer between the internal PE memory 26 and external memory (not shown).

The Instruction controller 14 receives instructions from a cache (not shown) and sorts them into the following categories:
  instructions to be executed by the serial processor 10;
  instructions to be executed by the ALU 22 of each PE 20 in the SIMD array 19; and
  instructions to be executed by the Register file 24 of each PE 20 in the SIMD array 19.
  instructions to be executed by the I/O unit 28 of each PE 20 in the SIMD array 19;

The instruction controller 14 then directs the instructions to the Array controller 16, the Load/Store controller 17, the I/O controller 18 or the Serial Processor 10, according to the execution location for the instruction. The Array controller 16, Load/Store controller 17 and I/O controller 18 each sort their received sets of instructions and send them on to the appropriate execution units of the PEs in the SIMD Array.

Figure 3:
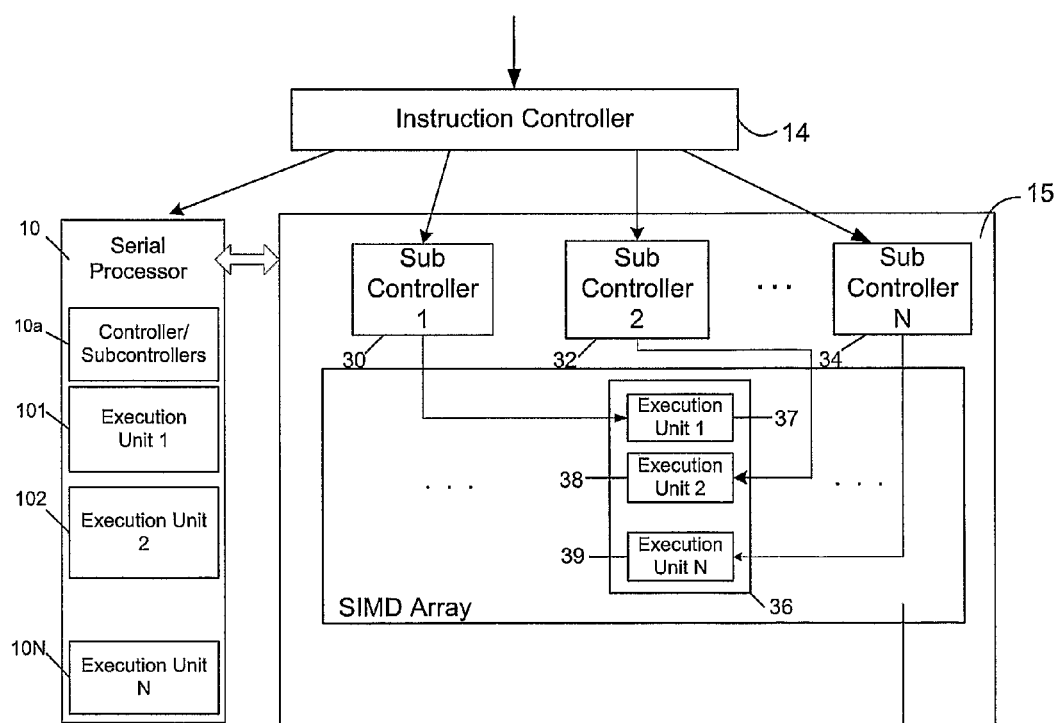

FIG. 3 illustrates a generalised embodiment of the present invention which again includes an instruction controller 14, a serial processor 10, and a parallel processor 15. In FIG. 3, the parallel processor includes a SIMD array 19 of processing elements (PEs) 36. Again, for the sake of clarity, only a single PE is illustrated in FIG. 3. It will be readily appreciated that the SIMD array 19 can include any number of PEs 20. Each PE includes a number of execution units (N in the example) 37, 38, 39. Each execution unit performs a specific task in the PE, although the same task may be performed by more than one execution unit. In the embodiment of FIG. 3, the parallel processor 15 also includes N sub controllers 30, 32 . . . 34 which receive respective instruction types from the instructions controller. The number of sub controllers in FIG. 3 corresponds to the number of execution units in each PE 36 of the SIMD array 19.

FIG. 3 illustrates the general case; specific examples of execution units include ALU, floating point unit (FPU), multiply-accumulate unit (MAC), I/O control and register storage. It will be readily appreciated that other execution units can be provided in a PE in an embodiment of the invention.

The serial processor 10 also comprises a plurality of execution units. The execution units 101, 102 . . . 10N operate in a similar manner to those in the PEs in the SIMD array. The serial processor includes a controller 10a which distributes the instructions to the appropriate execution unit. The controller 10a can be a single controller or can be provided by a plurality of subcontrollers corresponding to respective execution units in the serial processor.

Instructions are received by the instruction controller, and are distributed to the serial processor 10, or to one of the sub controllers 30, 32, 34, in dependence upon the type of instruction. Each sub controller sorts its received instructions and transfers them to the appropriate part of the PEs 36 in the SIMD array for processing.

In one example, one sub controller can forward instructions to more than one execution unit. This would have the advantage of saving space on the IC, at the possible expense of a slight loss of performance.

Figure 4:
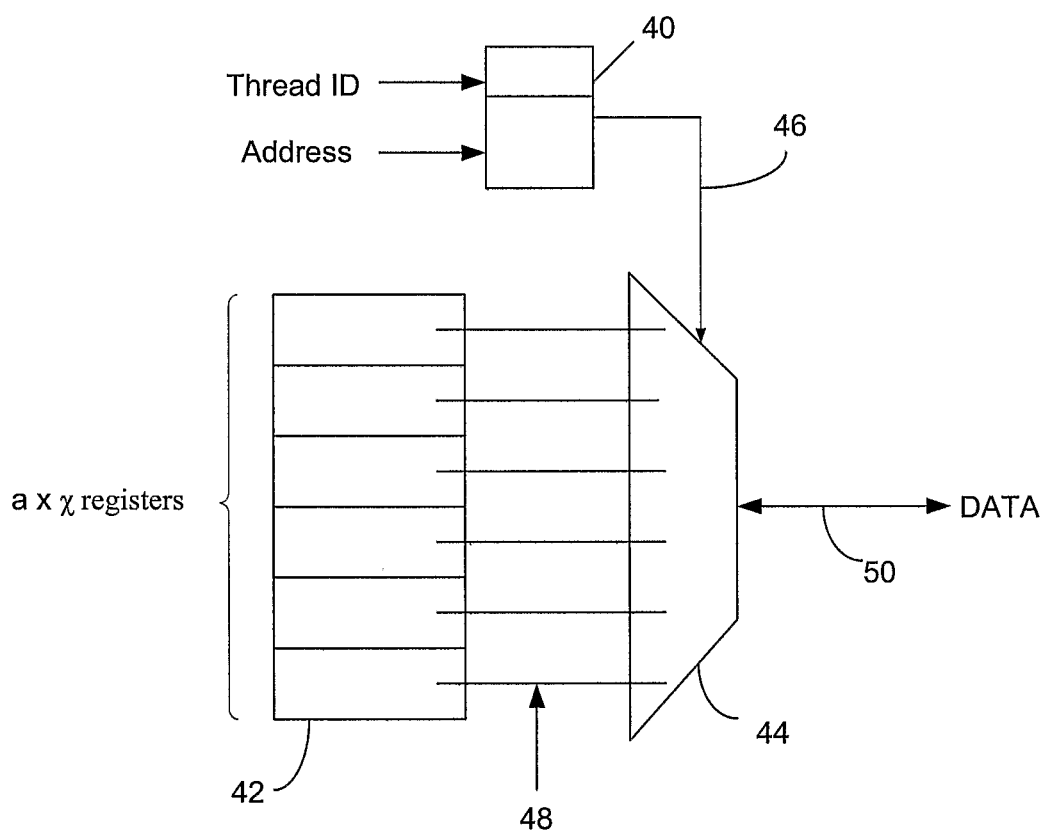
FIG. 4 is a schematic block diagram of a part of the architectures of FIGS. 2 and 3.

FIG. 4 illustrates a register file 42 for use in a processing element which includes an execution unit which operates on data stored in the register file, and which is able to process multiple instruction threads. The register file can also be used in the serial processor 10. Such a register file embodies another aspect of the invention. The parallel processor 15 can process a predetermined maximum number of instruction streams (threads). The register file 42 is provided with a set of registers for each such thread. Accordingly, for a parallel processor able to process A threads, the register file 42 comprises A groups registers. Each group includes a predetermined number x of registers. The x registers are provided for storing individual register data items. In one possible example, 128 registers are provided in each group. The register file 42 is accessed via a demultiplexer 44 which is addressed using an addressing unit 40. The addressing unit 40 receives as inputs a thread ID and a register address, in order to generate an overall register address for the multiplexer. In this way, data 48 can be transferred from the register 42 via the demultiplexer 44 as an output signal 50. Such an extended register storage device can enable the fast switching of threads being processed, without the need for output and storage of existing register values, and input of new register values for the next thread. The register file embodying this aspect of the present invention enables multi-tasking. Such an enhanced register file is advantageous because the silicon area used by a longer register is less than the factor by which the register file is increased. For example, for a doubling of the register file size, the silicon area increases by less than twice. This is due to the fact that there is a fixed amount of area used which is independent of the capacity of the register file.

Figure 5:
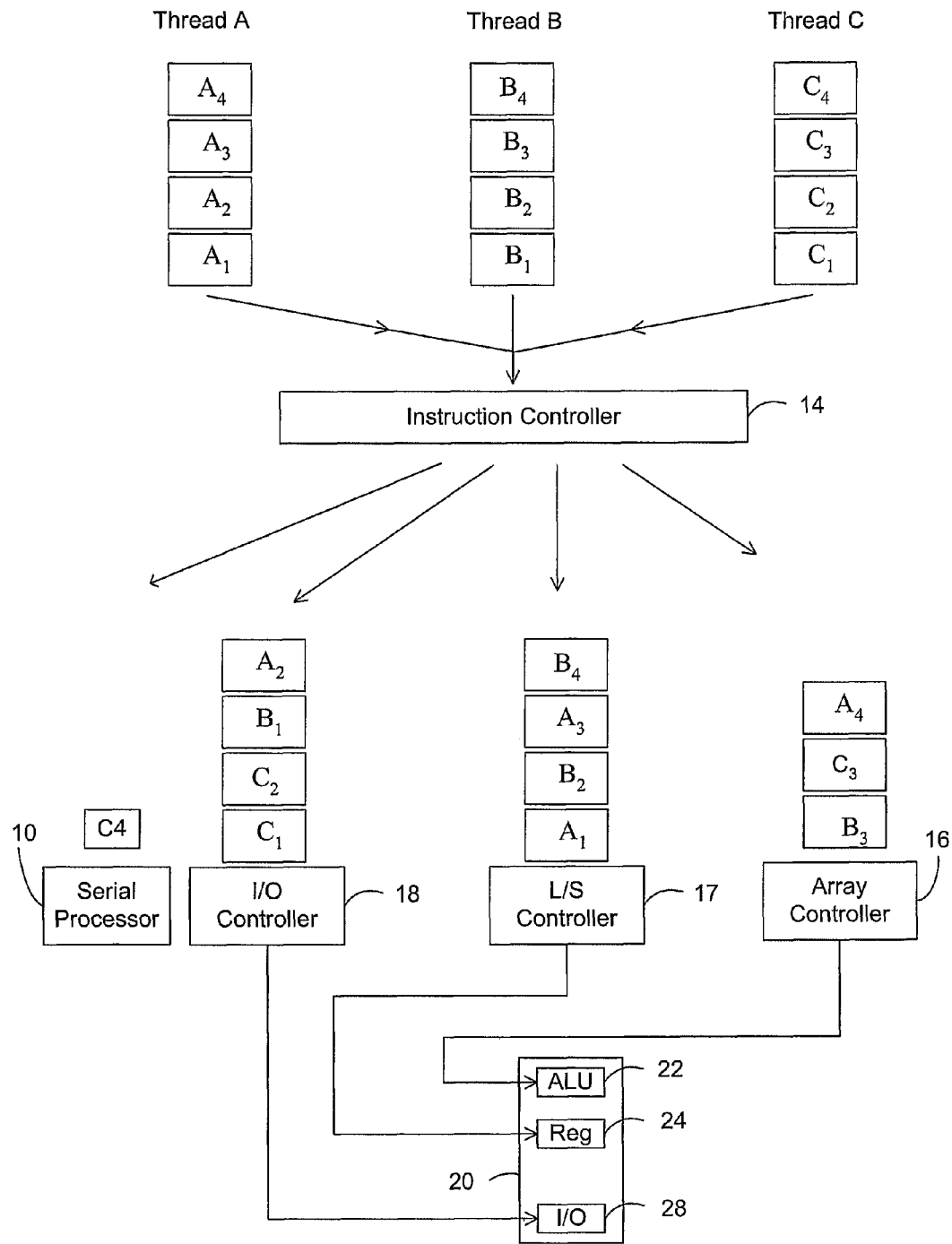
FIG. 5 is a flow diagram illustrating instruction flow in an embodiment of the present invention.

FIG. 5 shows an example of how an instruction stream may be distributed in an embodiment of the present invention. In the example shown, three different instruction threads, A, B and C, each of which contains a number of separate instructions, are queued for supply to the serial processor 10 or parallel processor 15. Thread A, for example, contains instructions $A_1$, $A_2$, $A_3$ and $A_4$. As an example, the three controllers 16, 17, 18 and serial processor 10 described with reference to FIG. 2 are shown in FIG. 5: the Array controller 16, the load/store controller 17 and the I/O controller 18, in addition to the serial processor 10. Only one PE 20 of the multiple PEs in the SIMD array 19 is shown for the sake of clarity. Instructions from each thread are input to the instruction controller 14. The instruction controller 14 distributes the instructions to each of the controllers 16, 17, 18 or serial processor 10, according to where the instruction is to be executed. In the example shown in FIG. 5, instructions $C_3$, $B_3$ and $A_4$ are arithmetic instructions, and so are to be executed in the ALU. These instructions are therefore distributed to the Array controller 16, since the Array controller 16 controls supply of instructions to the ALU 22. Instructions to be executed in the I/O part 28 are sent to the I/O controller 18, and instructions to be executed in the register file 24 are sent to the load/store controller 17. Each controller can then prioritise its own queue of received instructions. Similarly, instruction $C_4$ is transferred to the serial processor.

Consider, for example, the instructions of thread C, shown in FIG. 5. Instruction $C_3$ represents an arithmetic instruction to be performed on operands retrieved using I/O instructions $C_1$ and $C_2$. Accordingly, instruction $C_3$ must be held in the ALU queue until the I/O instructions $C_1$ and $C_2$ have been completed.

In this case, rather than first sending instruction $C_3$ to the PE, the array controller is able to send other ALU instructions, from other instructions streams. This prioritisation is also applicable in reverse. For example, an I/O or memory (register file) operation may have to be performed after an ALU instruction in the instruction stream concerned. In such a case, other stream's I/O instructions can be performed whilst the ALU instruction of the other stream is completed.

If instruction $B_3$, for example, is independent of instructions $B_1$ and $B_2$, then it can be processed out of order in thread B.

Such prioritisation enables each execution unit (ALU, memory or I/O) of the PE 20 to be operating for a maximised amount of time. Such a scheme overcomes a disadvantage of the previously-considered systems, namely that the execution units of the PE are unused for significant periods of time when other units are in use. Embodiments of the present invention are then able to provide efficient multithreading capability in a SIMD environment, by scheduling and directing the individual instructions from the instruction streams as described above.

The invention claimed is:

1. A multiprocessor system, comprising:
a single instruction multiple data (SIMD) array comprising a plurality of processing elements, wherein each processing element comprises components including an arithmetic logic unit (ALU), a register file and an internal memory;
an instruction controller operable to receive a plurality of instruction streams associated with processing threads; and
a plurality of sub controllers which are each linked to a specific component within a processing element, so that a first sub controller is linked to an ALU, a second sub controller is linked to a register file and a third sub controller is linked to an internal memory,
wherein each sub controller is operable to,
receive instructions of a specific type from the instruction controller,
prioritize the received instructions, which involves executing an instruction from another stream if a current instruction is waiting for a preceding instruction to complete, and
send the received instructions to a specific component that the sub controller is linked to within each processing element in the SIMD array, wherein the specific component is operable to process instructions of that specific type;
wherein the components within each processing element are operable to process respective instructions in parallel with one another.

2. The multiprocessor system of claim 1, wherein an instruction can be:
a computational instruction to perform a computational operation involving an ALU;
a load/store instruction to move data between an internal memory and a register file; or
an I/O instruction to transfer data between the internal memory and an external memory.

3. The multiprocessor system of claim 1, wherein the instruction controller is operable to distribute instructions from at least two different instruction streams to the processing elements of the SIMD array.

4. The multiprocessor system of claim 1, wherein the instruction controller is operable to distribute instructions from a single instruction stream to the processing elements of the SIMD array.

5. The multiprocessor system of claim 1, wherein the instructions are prioritized based on dependencies between the instructions.

6. The multiprocessor system of claim 1, wherein a register file within each processing element in the SIMD array includes a plurality of register sets, wherein each register set is associated with a respective processing thread.

7. The multiprocessor system of claim 1, further comprising a serial processor which includes components, including an arithmetic logic unit (ALU), a register file and an internal memory;
wherein the instruction controller is also operable to distribute instructions to the components of the serial processor based on the instruction types of the received instructions; and
wherein the components of the serial processor are operable to process respective instructions in parallel with one another.

8. The multiprocessor system of claim 1, wherein the instruction controller is operable to receive a plurality of instruction streams relating to respective processing threads, and to distribute instructions to the components of the processing elements in the SIMD array such that successive instructions for each component originate from different instruction streams.

9. The multiprocessor system of claim 1, wherein the register file in each processing element in the SIMD array includes an addressing unit which is operable to receive a register address and a thread indicator, and to access a register within the register file based upon the register address and the thread indicator.

10. A method for executing instructions in a multiprocessor which includes a plurality of processing elements arranged in a single instruction multiple data (SIMD) array, wherein each processing element comprises components, including an arithmetic logic unit (ALU), a register file and an internal memory, the method comprising:
receiving a plurality of instruction streams associated with processing threads;
determining instruction types for instructions in the plurality of instruction streams;
using a separate controller for each type of instruction to prioritize instructions of each type,
wherein each controller is linked to a specific component within a processing element, so that a first controller is linked to an ALU, a second controller is linked to a register file and a third controller is linked to an internal memory, and wherein prioritizing the instructions involves executing an instruction from another stream if a current instruction is waiting for a preceding instruction to complete; and sending the prioritized instructions from each controller to an associated specific component which is operable to process an instruction of the specific type handled by the controller;

wherein the components within each processing element are operable to process respective instructions in parallel with one another.

11. The method of claim 10, wherein a given instruction in a given instruction stream can be one of the following types of instructions, a computational instruction to perform a computational operation involving an ALU;

a load/store instruction to move data between an internal memory and a register file; and an I/O instruction to transfer data between the internal memory and an external memory.

12. The method of claim 10, wherein sending the instruction involves sending instructions from at least two different instruction streams to the processing elements of the SIMD array.

13. The method of claim 10, wherein sending the instruction involves sending instructions from a single instruction stream to the processing elements of the SIMD array.

14. The method of claim 10, wherein the instructions are prioritized based on dependencies between the instructions.

15. The method of claim 10, wherein a register file within each processing element in the SIMD array includes a plurality of register sets, wherein each register set is associated with a respective processing thread.

16. The method of claim 10, wherein sending the received instructions involves sending the received instructions to a serial processor which includes components, including an arithmetic logic unit (ALU), a register file and an internal memory;

wherein instructions are sent to components of the serial processor based on the instruction types of the received instructions; and wherein the components of the serial processor are operable to process respective instructions in parallel with one another.

17. The method of claim 10, wherein sending the received instructions involves sending the received instructions to the components of the processing elements in the SIMD array such that successive instructions for each component originate from different instruction streams.

18. The method of claim 10, wherein the register file in each processing element in the SIMD array includes an addressing unit which is operable to receive a register address and a thread indicator, and to access a register within the register file based upon the register address and the thread indicator.

* * * * *